Aug. 31, 1965    MASAMITSU KAWAKAMI ETAL    3,204,209
VARIABLE-INDUCTANCE TUNER
Filed May 3, 1963
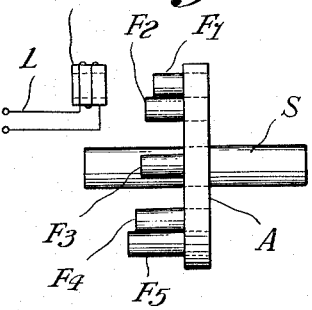
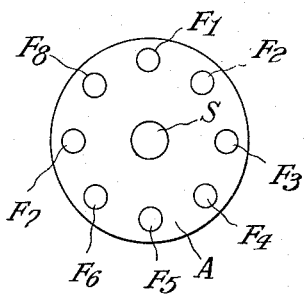
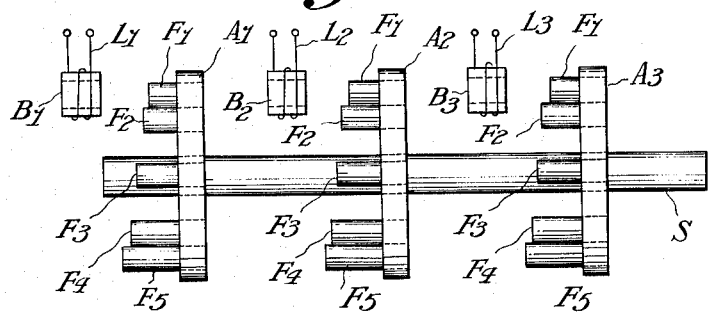
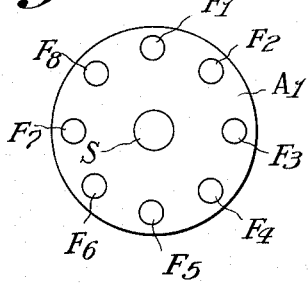
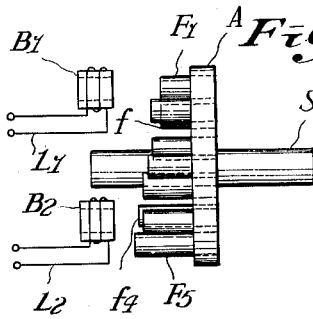
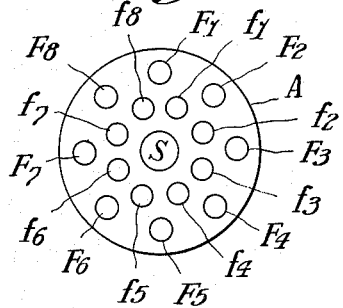

United States Patent Office 3,204,209
Patented Aug. 31, 1965

3,204,209
VARIABLE-INDUCTANCE TUNER
Masamitsu Kawakami and Mahoki Onoda, Tokyo-to, Japan, assignors to Kabushiki Kaisha Toko Radio Coil Kenkyusho, Tokyo-to, Japan, a joint-stock company of Japan
Filed May 3, 1963, Ser. No. 277,835
6 Claims. (Cl. 336—131)

This invention relates to electrical tuning devices of the variable-inductance type, and more particularly it relates to a novel tuning device capable of varying inductance without the use of electrical contacts.

In the case of conventional tuners for similar purpose, those of both the switch type and the turret type require a large number of electrical contacts, which are disadvantageous because of their progressively increasing contact resistance tending to cause failures.

It is an object of the present invention to eliminate the foregoing disadvantage by providing a new tuner in which no contacts are used.

It is another object of the invention to provide a tuner as stated above which has a simple construction and operation.

It is a further object of the invention to provide a new contactless tuner capable of simultaneously varying the inductances of several coils which has a relatively simple construction and operation.

The nature and details of the invention will be best understood by reference to the following description of preferred embodiments of the invention when taken in conjunction with the accompanying drawings in which like parts are designated by like reference symbols, and in which:

FIG. 1 is a side elevational view of one embodiment of the invention;

FIG. 2 is an end elevational view of a rotor plate of the embodiment of FIG. 1;

FIG. 3 is a side view showing the second embodiment of the present invention, in which the embodiment of FIG. 1 is applied to vary simultaneously the inductances of several coils;

FIG. 4 is an end elevational view showing a rotor plate of the embodiment of FIG. 3;

FIG. 5 is a side view showing the third embodiment of the present invention, said embodiment being a modification of the embodiment of FIG. 3; and FIG. 6 is an end elevational view showing a rotor plate of the embodiment of FIG. 5.

Referring to FIGS. 1 and 2, the embodiment of the tuner of this invention consists, essentially, of a rotor shaft S so supported as to be shiftable in its axial direction and turnable, a rotor plate A fixed to the shaft S and provided with a plurality of rod-shaped, protruding variable members $F_1$, $F_2$, $F_3$, . . . $F_8$ secured on one surface thereof at a constant radial distance from the centerline of the shaft S in such a manner that the length of protrusion of each variable member is different from those of the other variable members, and a hollow bobbin B suporting a coil L wound thereabout. The bobbin B is so disposed to confront one of the said variable members $F_1$, $F_2$, $F_3$, . . . $F_8$ as to enable the said one variable member to be moved freely in and out of the hollow interior of the said bobbin B by the axial shifting of the said shaft S.

In the operation of the tuner of FIGS. 1 and 2, a certain inductance of the coil is selected by turning the rotor shaft so that one (for example, $F_1$) of the variable members $F_1$, $F_2$, $F_3$, . . . $F_8$ is aligned with and confronting the bobbin B, and shifting the shaft S toward the bobbin so as to insert the said one variable member $F_1$ into the hollow interior of the bobbin B. Then, in order to obtain another value of the inductance, the rotor shaft S is shifted in the opposite direction (away from bobbin B) so as to extract the variable member $F_1$ from the bobbin B, then rotated to the appropriate rotational angle, and again shifted toward the bobbin B so as to cause another variable member, for example, $F_3$, to be inserted into the bobbin, whereby the variation operation is accomplished. The inductance of the coil varies with the length of the variable member inserted into the bobbin, increasing with the length when the variable member is made of a magnetic material such as ferrite and decreasing with the length when the variable member is made of a metal. Accordingly, it is possible to vary very easily the inductance of the coil L.

As mentioned hereinbefore, since no electrical contacts are used in the mechanism of the tuner of this invention, the tuner has a long serviceable life, and since, moreover, the operation of this tuner is simple, it is particularly applicable to such uses as that as a channel tuner of a television receiver.

Such a tuner according to this invention as illustrated in FIGS. 1 and 2 can be used in various modified states. For example, said tuner can be applied to form a multiple tuner. Such embodiment is shown in FIGS. 3 and 4.

The multiple tuner of FIGS. 3 and 4 comprises a horizontal rotating shaft S which is movable in the horizontal, axial direction and has at certain space intervals a plurality of rotor plates $A_1$, $A_2$, and $A_3$ which are fixed thereon. Each of these rotor plates has, protruding from one surface thereof at a constant radial distance from the centerline of the shaft S, a plurality of rod-shaped variable members $F_1$, $F_2$, $F_3$, . . . made of a magnetic material or metal. Each variable member is secured at its root end to the surface of its rotor plate. The lengths of protruding parts of the variable members belonging to each rotor plate are made to be different from one another, and the variable members of all rotor plates are protruding in the same direction (toward the left as viewed in FIGURE 3). A plurality of bobbins $B_1$, $B_2$, $B_3$, . . . suporting coils $L_1$, $L_2$, $L_3$, . . . respectively wound therearound are so disposed in tandem arrangement that each said bobbin confronts one of the variable members $F_1$, $F_2$, $F_3$, . . . of one of the rotor plates $A_1$, $A_2$, $A_3$, . . . so as to enable the said one variable member freely to be moved in and out of the said bobbin by the axial shifting of the shaft S.

In the operation of the tuner of FIGS. 3 and 4, a certain inductance of each coil is selected by rotating the shaft to the appropriate angular position and shifting the shaft S toward the bobbins $B_1$, $B_2$, $B_3$, . . . thereby causing one (for example, $F_1$ of the variable members $F_1$, $F_2$, $F_3$, . . . of each of the rotor plates $A_1$, $A_2$, $A_3$, . . . to enter the bobbins $B_1$, $B_2$, $B_3$, . . . . Then in order to obtain an inductance of another value, the rotating shaft S is shifted in the opposite direction (away from the bobbins) to extract the variable members $F_1$ from their respective bobbins $B_1$, $B_2$, $B_3$, . . ., and the shaft S is rotated to the required rotational angle then shifted toward the bobbins to cause other variable members, for example, $F_3$, to be inserted into their respective bobbins $B_1$, $B_2$, $B_3$, . . ., thereby accomplishing variation. Since the inductance of each coil varies with the length of the variable member fitted in the above-described manner into the bobbin of the said coil, increasing with the length in the case of a variable member of magnetic material such as ferrite and decreasing with the length in the case of a variable member of metal, it is possible to vary the inductances of the coils of the bobbins $B_1$, $B_2$, $B_3$, . . . in the foregoing manner.

It will be observed that by the construction of FIGS.

3 and 4 the tuner of the present invention is conveniently capable of simultaneously varying the inductances of several coils with one mechanical operation.

In the embodiment of FIGS. 3 and 4, the tuner units are disposed in tandem arrangement in the axial direction, but said units may be disposed in parallel state. Such modified embodiment is shown in FIGS. 5 and 6, in which only two tuner units are combined, but more than two units may be similarly combined by increasing the diameter of the rotor plate.

Referring to FIGS. 5 and 6, the movable part of the multiple tuner consists of a rotor plate A which is fixed to an axially shiftable rotor shaft S, and which supports on one surface thereof a plurality of rod-shaped, protruding variable members $F_1$, $F_2$, $F_3$, ... $F_8$, which are made of a magnetic material or a metal, at a certain radial distance from the centerline of the shaft S and similar variable members $f_1$, $f_2$, $f_3$, ... $f_8$ at another, radial distance from the said centerline, all said variable members protruding in the same direction (toward the left as viewed in FIG. 5) and being secured to the said surface of the rotor plate A in such a manner that their protrusion lengths are made to be different from one another. The stationary part of the tuner consists of a plurality of hollow bobbins $B_1$ and $B_2$ which respectively support coils $L_1$ and $L_2$ wound therearound, and which are disposed in the same plane perpendicular to the shaft S. Furthermore, the bobbin $B_1$ is so positioned that one of the variable members in the group $F_1$, $F_2$, $F_3$, ... $F_8$ can be moved into and out of the hollow interior of the bobbin $B_1$, while the bobbin $B_2$ is so positioned that one of the variable members in the group $f_1$, $f_2$, $f_3$, ... $f_8$ can be moved into and out of the hollow interior of the bobbin $B_2$.

In the operation of the tuner of FIGS. 5 and 6, a certain inductance of each of the coils $L_1$ and $L_2$ is selected by shifting the rotor shaft S toward the bobbins $B_1$ and $B_2$ ... disposed in the same plane so as to insert one (for example, $F_1$) of the variable members in the group $F_1$, $F_2$, $F_3$, ... $F_8$ and one (for example, $f_1$) of the variable members in the group $f_1$, $f_2$, $f_3$, ... $f_8$ into the bobbins $B_1$ and $B_2$, respectively. When other values of inductances are to be selected, the rotor shaft is shifted in the opposite direction (away from the bobbins) so as to extract the variable members $F_1$ and $f_1$ from the bobbins $B_1$ and $B_2$, then the rotor shaft is turned to the appropriate rotational angle and shifted toward the bobbins $B_1$ and $B_2$, so as to insert other variable members (for example, $F_3$ and $f_3$) into the bobbins $B_1$ and $B_2$, respectively, thereby accomplishing variation operation. The inductance of each coil varies with the length of the variable member inserted into the bobbin, increasing with the length when the variable member is made of a magnetic material such as ferrite and decreasing with the length when the variable member is made of a metal. Accordingly, it is possible to vary the inductance of the coil in the above-described manner.

It will be observed that construction of FIGS. 5 and 6 is conveniently capable of simultaneously varying the inductances of several coils with one mechanical operation.

Such modifications and changes are considered to be within the full intended scope of the invention, as defined by the appended claims.

What is claimed is:

1. A variable inductance tuner comprising a rotor shaft which is shiftable in its axial direction, a rotor plate fixed to the said rotor shaft, a plurality of rod-shaped variable members made of a magnetic material which are secured to one surface of the said rotor plate in such a manner as to protrude in the same direction parallel to the said shaft from the said surface at a certain radial distance from the centerline of the said shaft and in such a manner that the length of protrusion of each of said variable members are made to be different from those of other variable members, and a hollow bobbin which supports a coil wound therearound, and which is disposed to confront one of the said variable members so as to enable the said one variable member to be moved into and out of the hollow interior of the said bobbin by the axial shifting of the said rotor shaft.

2. A variable inductance tuner comprising a rotor shaft which is shiftable in its axial direction, a rotor plate fixed to the said rotor shaft, a plurality of rod-shaped variable members made of a metal which are secured to one surface of the said rotor plate in such a manner as to protrude in the same direction parallel to the said shaft from the said surface at a certain radial distance from the centerline of the said shaft and in such a manner that the length of protrusion of each of said variable members are made to be different from those of other variable members, and a hollow bobbin which supports a coil wound therearound, and which is disposed to confront one of the said variable members so as to enable the said one variable member to be moved into and out of the hollow interior of the said bobbin by the axial shifting of the said rotor shaft.

3. An electrical tuning device of variable inductance type comprising a rotor shaft which is shiftable in its axial direction, a plurality of rotor plates coaxially fixed at certain space intervals in the axial direction to the said rotor shaft, a plurality of rod-shaped variable members made of a magnetic material, said variable members being secured to one surface of each of the said rotor plates in such a manner as to protrude therefrom at a constant radial distance from the centerline of the said shaft and in such a manner that the length of protrusion of each variable member is made to be different from those of the other variable members, all of the said variable members of all said rotor plates protruding in the same direction parallel to the said shaft, and a plurality of hollow bobbins which respectively support coils wound thereabout, and which are disposed in tandem arrangement so that each said bobbin confronts one of the said variable members of one of the said rotor plates and is in a position to enable the said one variable member to be moved in and out of the hollow interior of the said bobbin by the axial shifting of the said rotor shaft.

4. An electrical tuning device of variable inductance type comprising a rotor shaft which is shiftable in its axial direction, a plurality of rotor plates coaxially fixed at certain space intervals in the axial direction to the said rotor shaft, a plurality of rod-shaped variable members made of a metal material, said variable members being secured to one surface of each of the said rotor plates in such a manner as to protrude therefrom at a constant radial distance from the centerline of the said shaft and in such a manner that the length of protrusion of each variable member is made to be different from those of the other variable members, all of the said variable members of all said rotor plates protruding in the same direction parallel to the said shaft, and a plurality of hollow bobbins which respectively support coils wound thereabout, and which are disposed in tandem arrangement so that each said bobbin confronts one of the said variable members of one of the said rotor plates and is in a position to enable the said one variable member to be moved in and out of the hollow interior of the said bobbin by the axial shifting of the said rotor shaft.

5. An electrical tuner of variable inductance type comprising a rotor shaft which is shiftable in its axial direction, a rotor plate fixed to the said rotor shaft, at least a first group and a second group of a plurality of rod-shaped inductance variable members made of a magnetic material which are secured to one surface of the said rotor plate in such a manner as to protrude in the same direction parallel to the said shaft from the said surface and in such a manner that the length of protrusion of each of the said variable members is made to be different from those of the other variable members, the said variable members of one said group being disposed at a certain radial distance from the centerline of the said shaft and the said variable members of another said group being disposed at another radial distance from said centerline, and a plurality of hollow bobbins which support a plurality of coils wound respectively therearound, and which are disposed in one plane perpendicular to the said shaft at respective positions such that the said bobbins respectively confront one of the said variable members of a different group so as to enable the said variable members so confronted to be moved into and out of the hollow interior of the confronting bobbins by the shifting of the said shaft.

6. An electrical tuner of variable inductance type comprising a rotor shaft which is shiftable in its axial direction, a rotor plate fixed to the said rotor shaft, at least a first group and a second group of a plurality of rod-shaped inductance variable members made of a metal which are secured to one surface of the said rotor plate in such a manner as to protrude in the same direction parallel to the said shaft from the said surface and in such a manner that the length of protrusion of each of the said variable members is made to be different from those of the other variable members, the said variable members of one said group being disposed at a certain radial distance from the centerline of the said shaft and the said variable members of another said group being disposed at another radial distance from said centerline, and a plurality of hollow bobbins which support a plurality of coils wound respectively therearound, and which are disposed in one plane perpendicular to the said shaft at respective positions such that the said bobbins respectively confront one of the said variable members of a different group so as to enable the said variable members so confronted to be moved into and out of the hollow interior of the confronting bobbins by the shifting of the said shaft.

No references cited.

JOHN F. BURNS, *Primary Examiner.*